J. F. PALMER.
TIRE CASING.
APPLICATION FILED JAN. 2, 1906.

924,267.

Patented June 8, 1909.
2 SHEETS—SHEET 1.

Witnesses:
J. E. Sherry
X. M. Cornwall

Inventor:
John F. Palmer,
by Ritter, Miles & Shurvey
Attys.

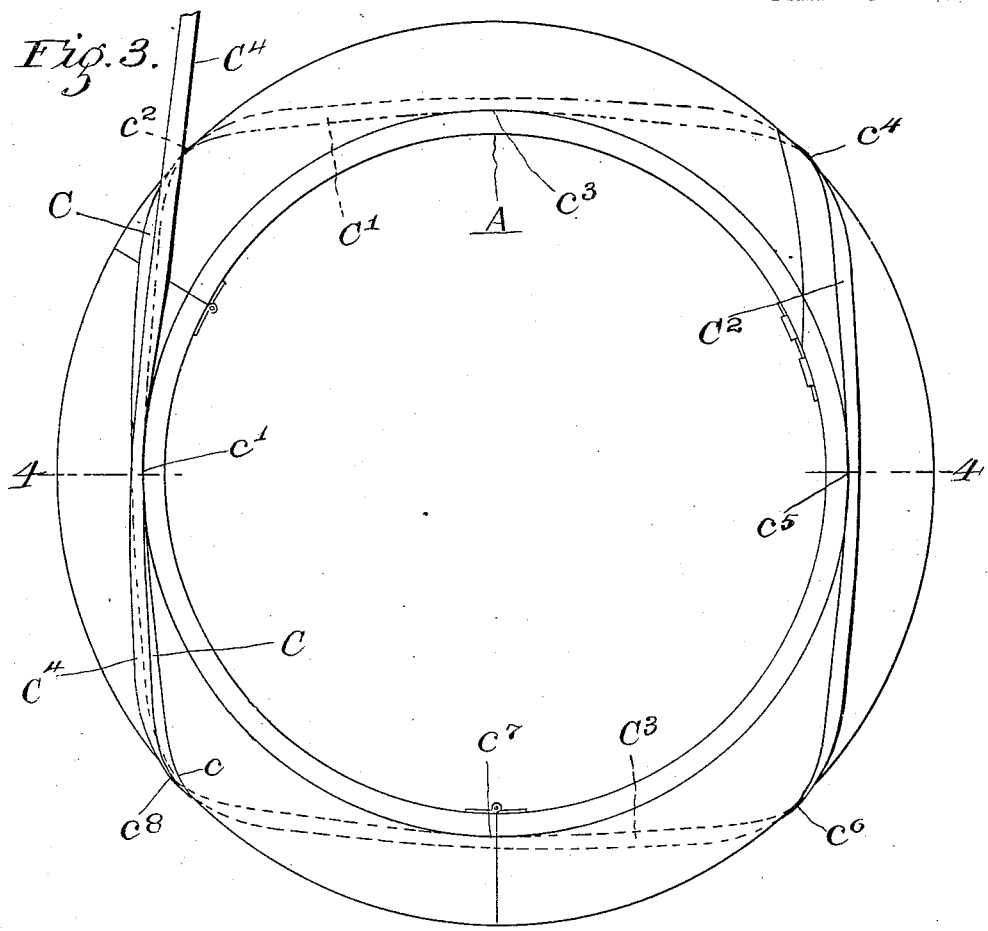
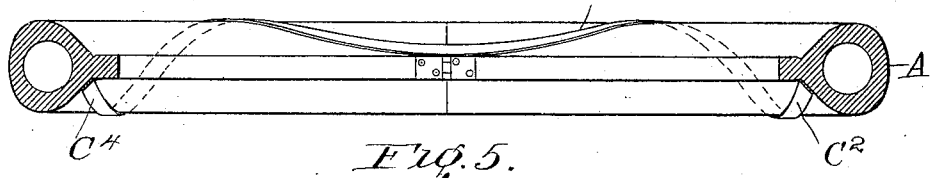
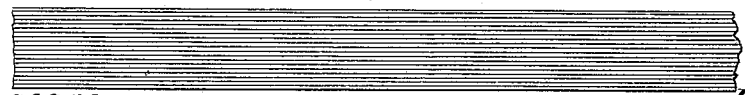

UNITED STATES PATENT OFFICE.

JOHN F. PALMER, OF CHICAGO, ILLINOIS.

TIRE-CASING.

No. 924,267.  Specification of Letters Patent.  Patented June 8, 1909.

Application filed January 2, 1906. Serial No. 294,112.

*To all whom it may concern:*

Be it known that I, JOHN F. PALMER, a citizen of the United States of America, residing at Chicago, in the county of Cook and State of Illinois, have invented certain new and useful Improvements in Tire-Casings, of which the following is a specification.

My invention relates to improvements in tire casings and is fully described and explained in this specification and shown in the accompanying drawings, in which—

Figure 1:
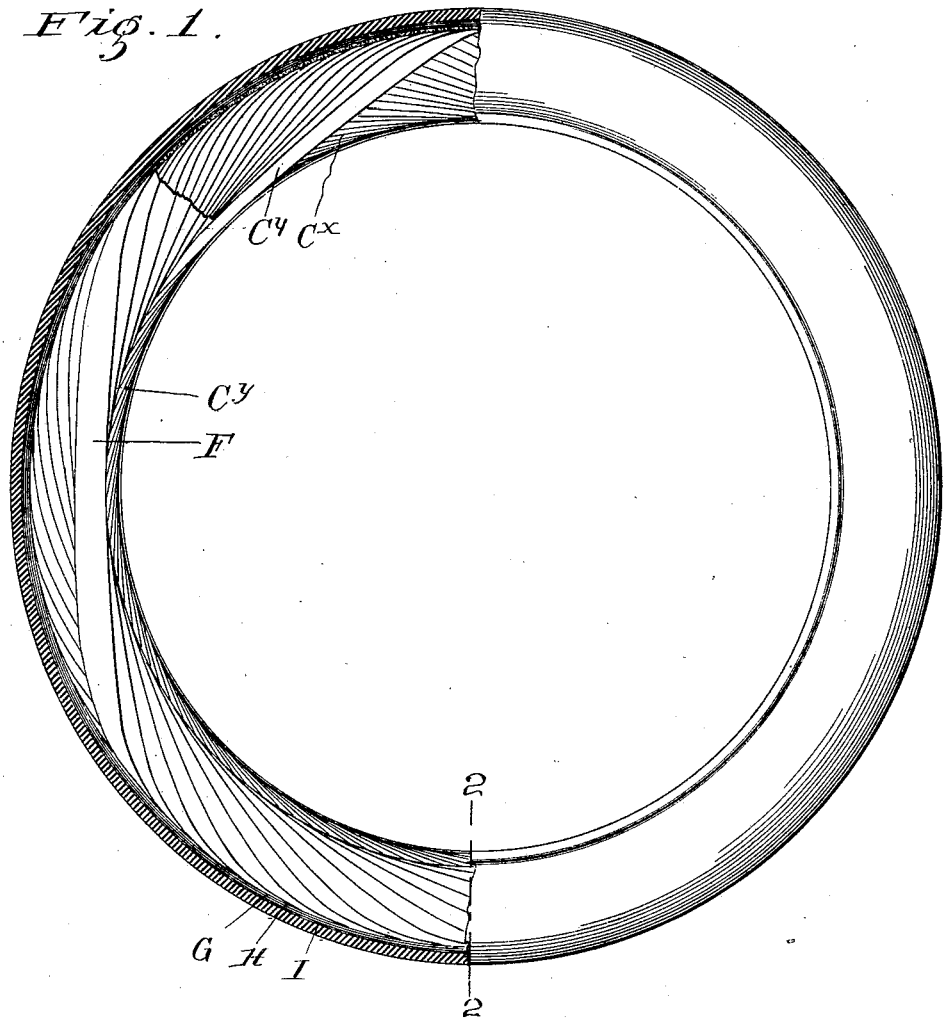
Figure 2:
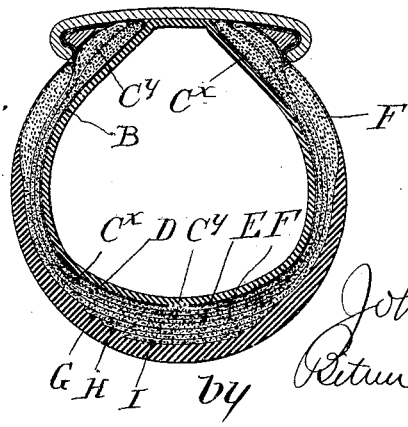

Figure 1 is a side elevation of my improved tire casing, certain of the layers being broken away to show the construction; Fig. 2 is a transverse section through the tire, taken in the line 2—2 of Fig. 1; Fig. 3 is a diagrammatic view showing the winding of the tire casing, Fig. 4 is a diametrical section through the mandrel showing a strand of the winding in place thereon, the section being taken in the line 4—4 of Fig. 3, and Fig. 5 is a face view of a fragment of band used in making up my tire.

The tire herein illustrated is an improvement in certain particulars upon tires of the type wherein the threads which withstand the tractional strain in use, run in approximately tangential lines from the rim of the wheel to which the casing is detachably secured, to, or across, the tread of the casing which comes in contact with the ground or surface upon which the wheel runs. It will presently be obvious that the improvement to which this invention relates can be incorporated in tires of various forms. The form here illustrated resembles, in a general way, the tire of my application for patent on tire casings, filed October 12, 1905, and allotted Serial Number 282,373. Other constructions can be adopted some of which are, and some of which may not be, covered by said application. In the tire of said application the tractional strain on the tire when on a driven wheel is resisted by the tangential strands and at any particular moment, the threads which resist this strain are those which run from that portion of the casing which happens to be in contact with the ground to the wheel rim. As wheels provided with the tires of said application roll along the ground this tractional strain is successively resisted by the various tangential strands of the tires, but only a few strands resist this strain at any one time.

It is the object of my present invention to unify the tangential strands in such a way that all will coöperate to transmit the tractional force to the tread of the tire, the strain being subdivided among a large number of the tangential strands.

In forming my tire, I use a mandrel, A, composed of three sections hinged together so that it can be removed with ease from the complete casing. As the first step in the construction of this casing, I place upon this mandrel a layer of elastic fabric, such as stockinet, frictioned on the outer face to make it adherent. This layer furnishes an inner skin for the casing. Upon this layer of stockinet I preferably wind a plurality of circumferential turns of a comparatively non-elastic band which, preferably, is suitably rubber-covered to make it adherent. The method of winding this band will be best understood by referring to Fig. 3, where it will be seen that the first strand, C, of the band starts at a point, $c$, on the tread of the casing; that from the point, $c$, it extends to a point, $c^1$, on the inner or free edge of the casing, which it strikes at a tangent; and that it extends thence, following as far as possible the same straight line, to a second point, $c^2$, on the tread of the casing. In this way, this strand, C, forms a chord of an arc, when viewed in side elevation, the chord being tangent to the circle of the free edge of the casing at its point of contact therewith and being in a plane at right angles to the face of the casing. The band, when it reaches the tread at, $c^2$, is laid across the tread and from thence is carried forward to form the second strand, $C^1$, which is on the opposite side of the casing from the first strand and runs in a similar manner, *i. e.* in a straight line from the point, $c^2$, to the point, $c^4$, on the tread of the casing and tangent at the point, $c^3$, to the inner or free edge thereof. The band, when it again reaches the tread of the casing, at $c^4$, is brought back across the tread to form the third strand, $C^2$, which is on the same side of the casing as the strand, C, and extends from the point, $c^4$, to the point, $c^6$, being tangent to the curve of the free edge at $c^5$. When the band reaches the tread of the casing at, $c^6$, having meanwhile passed the inner edge thereof at a tangent it is again laid across the tread to form the fourth strand, $C^3$, which, like the strand, $C^1$, is on the rear side of the casing, as viewed in Fig. 3. This strand follows a course similar to that of the strand $C^1$, and after passing, the free edge of the casing on a tangent line, at $c^7$, reaches the tread of the tire at $c^8$, slightly in advance of the point of departure, $c$, of the first strand, C. The band is then laid across the tread to form a fifth strand, $C^4$, which lies in advance of the first strand, C, and crosses it very near its point of tangency to the free edge of the casing. The wrapping of the band is continued in the same way to form other strands, each one of which lies in advance of the corresponding strand immediately preceding it. It will be seen that by following this course of winding the entire surface of the inner layer, B, may be covered with a layer of strands, each one of which runs in opposite directions from a point on the free or inner edge of the casing to two points on the tread. In actual practice, these strands will lie as close together as possible, so as to cover closely the entire surface of the inner layer, as illustrated in Fig. 1. It will be evident that the band may cross the tread of the casing more or less than four times in making a complete circuit thereof. When it is wound continuously about the circumference of the casing (as illustrated in the drawings) the arcs subtended by the strands of each circuit should be such that in the winding of the successive circuits, the crossing-points will be distributed in suitable succession about the circumference, instead of lying one directly over the other. Obviously, however, each complete circuit might be formed from a short band or a plurality of short bands having their ends lapped or otherwise secured together, and in that case the spaces between the crossing-points should preferably be such as to form a complete and exact circuit ending at its starting point. In building tires, the winding thus explained can be continued indefinitely one complete layer being wound over another until the requisite weight and strength are produced. In constructing my tire in its preferred form, I use for this tangential layer a band of fabric comprising a number of parallel filaments held together by a rubber body. This means of constructing a tire is particularly desirable for the reasons set forth in my prior application already referred to, and, inasmuch as it is my preferred form, I have described it herein. As far as my present invention is concerned however, the band can be increased or decreased in width as desired, or a single thread can be used in place of the band. In the remainder of the description of my tire and in the claims appended hereto, therefore, I shall use the term "filament" as a broad term covering a band or thread of any material, or any aggregation of bands or threads laid on the tire as a unit.

In constructing tires of this form, as well as of the form shown in the application referred to, the band is preferably laid flat on the mandrel and its course is determined by the curvature of the mandrel. Roughly speaking, each strand of the band between any two tread points lies in a single plane and may be termed (as I have termed it) a chord of an arc when viewed in side elevation. Mandrels can be constructed where these statements will be absolutely accurate, the strand being absolutely in a single plane. It will be obvious that when a mandrel curved in cross-section is adopted, the band will vary more or less from a perfect plane. In the form herein illustrated I use a mandrel which differs from the mandrel shown in my prior application, in that, instead of being arch-shaped in cross-section with parallel side walls, the side walls are under-cut, so that they approach each other at their inner edges. When the band is laid upon such a mandrel it must be mechanically pushed into place against the mandrel at the tangent points and the strands at their tangent points will, of course, have the outward slope of the side walls of the mandrel. When the winding is done on a mandrel of this type this slope of the side walls and of the strands at their tangent points causes each strand of the band to take the form illustrated in Fig. 3, instead of lying in a true plane. Thus a straight line connecting the two tread points of a single strand will lie inside the tangent point of said band. When a tire incorporating this type of winding is inflated the tension on the bands between the tread points causes the casing to contract forcibly against the rim of the wheel.

It will be seen that in this construction the band does not follow the rim at all but is tangent at a single point, the form of the winding being determined solely by the curvature of the mandrel and not by any distortion or twisting of the band in its own plane.

After the completion of one tangential winding such as that described, which may be represented in Figs. 1 and 2 by $C^x$, I wind upon the tread a unifying layer, D, of longitudinal strands which extend around the casing. I then wind upon the casing a second tangential winding $C^y$, followed by a second unifying layer, E, on the tread of longitudinal strands. Thereupon I wind upon the casing a supporting winding, F, similar to the windings, $C^x$, and $C^y$, or power-transmitting windings, but beginning, not at the immediate free edge of the casing, but some distance outside the same. I prefer also to make this supporting winding of broader bands of material, so as to keep the thickness of the side walls of the casing within reasonable limits. The drawings illustrate the relative proportions of the bands used in the two windings and, to give an absolute comparison, I may say that I have built successful tires where the power-transmitting windings, C$^x$, and C$^y$, were built of bands five-eighths of an inch wide, while the supporting winding, F, utilized a band or bands one and one-fourth inches wide.

Tires formed after the tangential manner herein set forth and as set forth in my prior application referred to have a tendency, when inflated, to flatten out into an oval form with the longer diameter of the oval parallel to the axis of the wheel upon which the tire is placed. The supporting winding, F, counteracts this tendency, because when pressure is applied, it tends to support the side walls of the tire and resist expansion. The side walls of the tire are thus sustained so that the flattening thereof which otherwise would occur is prevented. After the completion of the supporting winding, F, other unifying windings, G, H, I, are wound upon the tread of the casing. The unifying windings will necessarily thicken the tread of the tire and make it stronger and furthermore they operate to unify all the strands of the power-transmitting and supporting windings. With the tire of my prior application, the entire driving power of the vehicle is transmitted to the ground through the comparatively small number of strands which run from the portion of the tread in contact with the ground backward to the wheel-rim. As a result, a tremendous strain is thrown on these particular strands. By the use of the unifying windings, the tread points of all the strands are connected together, so that all the tangential or power-transmitting strands operate as a unit to transmit power, no matter what portion of the tread is in contact with the ground. Of course, in practice, the parts are all sufficiently elastic that the entire tire will not work together, although theoretically it should. As a matter of fact, the strongest pull is on the strands running from the tread point in contact with the ground to the rim; but these strands are greatly assisted by the other strands through the action of the unifying longitudinal layers. A very convenient way to form these layers is to utilize a flat band of parallel-threaded fabric as shown in Fig. 5; but this is not necessary and in some forms of tires, especially tires where the tread has a large cross-sectional curvature, it may be necessary to use separate threads to form these layers.

I claim as new and desire to secure by Letters Patent:—

1. A tire casing open on the rim side and embodying a filament which crosses the tread at intervals and between its crossing point on the tread runs tangentially to the inner or free edge of the casing, and a longitudinal filament running along the tread and unifying said tangentially wound filament.

2. A tire casing open on the rim side and embodying a filament wound about the tire following the same general rotary direction throughout its length, said filament crossing the tread at intervals and running tangentially to the inner or free edges thereof between its crossing points on the tread, said casing embodying also a unifying filament which runs longitudinally along the tread of the casing and operates to render the crossing points of said tangentially wound filament relatively immovable.

3. A tire casing embodying a filament wound about it, said filament crossing the tread at intervals and running to the inner or free edges of the casing at a tangent between its tread points and a second similar winding the tangent points of which are outside the free edges of the casing, whereby the side walls of the casing are supported when internal pressure is applied.

4. The combination in a tire casing open on the rim side, of a filament crossing the tread of the casing at intervals and running tangentially to the inner or free edges thereof between its crossing points and a second filament similarly wound and having its tangent points outside the inner or free edges, said second winding being constructed and arranged to support the side walls of the casing.

5. A tire casing open on the rim side and incorporating a flat band running from the edges of the casing at a tangent, crossing the tread and returning to the opposite free edge at a tangent, said band being wound upon a mandrel, the inner edges of which converge toward each other and the band being laid flat on the mandrel without substantial distortion, whereby a straight line connecting the tread points of a strand of band lies inside the tangent point of said length without causing said band to follow the curve of the free edge.

6. A tire casing open on the rim side and embodying a band composed of a plurality of parallel threads, said band extending at intervals from the inner edge of the casing on one side across the tread to the inner edge of the casing on the other side, and a longitudinal filament running along the tread and unifying the threads of said band.

7. A tire casing open on the rim side and embodying a band composed of a plurality of parallel threads, said band extending at intervals from the inner edge of the casing in opposite directions to points on the tread of the casing, and a longitudinal filament running along the tread and unifying the threads of said band.

8. The combination, in a tire casing open on the rim side, of a band composed of a plurality of parallel threads, said band crossing the tread of the casing at intervals and extending to the inner or free edges thereof between its crossing points, and a second band similarly wound, the points of which intermediate of the tread crossing points do not extend to the inner or free edge of the casing, said second band being constructed and arranged to support the side walls of the casing.

In witness whereof I have signed the above application for Letters Patent at Chicago, in the county of Cook and State of Illinois, this 27th day of December, A. D. 1905.

JOHN F. PALMER.

Witnesses:
   CHAS. O. SHERVEY,
   K. M. CORNWALL.